(12) United States Patent
Yoshikane et al.

(10) Patent No.: US 11,649,558 B2
(45) Date of Patent: May 16, 2023

(54) ELECTROLYTIC STRIPPING AGENT FOR JIG

(71) Applicant: OKUNO CHEMICAL INDUSTRIES CO., LTD., Osaka (JP)

(72) Inventors: Yusuke Yoshikane, Osaka (JP); Koji Kita, Osaka (JP)

(73) Assignee: OKUNO CHEMICAL INDUSTRIES CO., LTD., Osaka (JP)

( * ) Notice: Subject to any disclaimer, the term of this patent is extended or adjusted under 35 U.S.C. 154(b) by 590 days.

(21) Appl. No.: 15/507,382

(22) PCT Filed: Jan. 29, 2016

(86) PCT No.: PCT/JP2016/052588
§ 371 (c)(1),
(2) Date: Feb. 28, 2017

(87) PCT Pub. No.: WO2016/147709
PCT Pub. Date: Sep. 22, 2016

(65) Prior Publication Data
US 2017/0283979 A1     Oct. 5, 2017

(30) Foreign Application Priority Data
Mar. 13, 2015   (JP) .............................. JP2015-050567

(51) Int. Cl.
| | | |
|---|---|---|
| *C25F 5/00* | (2006.01) | |
| *C01B 7/09* | (2006.01) | |
| *C01B 21/38* | (2006.01) | |
| *C01C 1/00* | (2006.01) | |
| *C01G 55/00* | (2006.01) | |
| *C25D 5/56* | (2006.01) | |
| *C25D 17/06* | (2006.01) | |
| *C23C 18/16* | (2006.01) | |
| *C23C 18/30* | (2006.01) | |

(52) U.S. Cl.
CPC ................ *C25F 5/00* (2013.01); *C01B 7/096* (2013.01); *C01B 21/38* (2013.01); *C01C 1/00* (2013.01); *C01G 55/001* (2013.01); *C23C 18/163* (2013.01); *C23C 18/30* (2013.01); *C25D 5/56* (2013.01); *C25D 17/06* (2013.01); *C23C 18/1653* (2013.01)

(58) Field of Classification Search
CPC ............ C25F 5/00; C09K 13/04–13/12; C23F 1/14–1/44
See application file for complete search history.

(56) References Cited

U.S. PATENT DOCUMENTS

| | | | |
|---|---|---|---|
| 2,185,858 A | 1/1940 | Mason | |
| 2,649,361 A | 8/1953 | Springer et al. | |
| 3,351,556 A * | 11/1967 | Tsourmas | .................. C23F 1/44 |
| | | | 510/261 |
| 3,619,390 A * | 11/1971 | Dillenberg | ................ C25F 5/00 |
| | | | 205/717 |
| 3,650,958 A * | 3/1972 | Shipley | ........................ 252/79.1 |
| 3,819,494 A | 6/1974 | Fountain | |
| 3,912,603 A | 10/1975 | Mietens et al. | |
| 4,111,767 A * | 9/1978 | Kawagishi | ................ C25F 5/00 |
| | | | 205/717 |
| 4,128,463 A | 12/1978 | Formanik | |
| 4,233,124 A | 11/1980 | Tomaszewski | |
| 4,244,833 A * | 1/1981 | Tomaszewski | ........... C23F 1/44 |
| | | | 134/3 |
| 4,264,420 A * | 4/1981 | Tomaszewski | ........... C25F 5/00 |
| | | | 205/714 |
| 4,404,074 A * | 9/1983 | Tomaszewski | ........... C25F 5/00 |
| | | | 205/717 |
| 4,548,791 A | 10/1985 | Fletcher et al. | |
| 4,554,049 A | 11/1985 | Bastenbeck | |
| 4,606,797 A | 8/1986 | Taylor et al. | |
| 4,608,091 A | 8/1986 | Sullivan et al. | |
| 5,244,539 A * | 9/1993 | McGrath | ................ H05K 3/067 |
| | | | 134/2 |
| 5,639,360 A | 6/1997 | Prum et al. | |
| 6,331,239 B1 | 12/2001 | Shirota et al. | |
| 6,332,970 B1 * | 12/2001 | Coffey | ...................... C25F 5/00 |
| | | | 205/720 |

(Continued)

FOREIGN PATENT DOCUMENTS

| | | | |
|---|---|---|---|
| CN | 1626703 A | 6/2005 | |
| DE | 2146828 A1 * | 4/1973 | ................ C25F 5/00 |

(Continued)

OTHER PUBLICATIONS

Espacenet machine translation of DE-2146828-A1 (Year: 2020).*
Product Finishing ("Stripping of Plated Finishes", 2011) (Year: 2011).*
International Search Report dated Apr. 26, 2016, issued in counterpart International Application No. PCT/JP2016/052588 (2 pages).
Sugiyama, "Electrolytic Peeling Treatment of Jigs and Improvement of their Electrical Contact: Part 1", Jitsumu Hyomen Gijutsu, (1980), vol. 27, No. 9, pp. 442-447, (6 pages).
Extended (supplementary) European Search Repod dated Nov. 28, 2017, issued in counterpart European Application No. 16764540.7. (9 pages).

(Continued)

*Primary Examiner* — Alexander W Keeling
(74) *Attorney, Agent, or Firm* — WHDA, LLP

(57) ABSTRACT

An object of the invention is to provide a jig electrolytic stripper that can sufficiently remove palladium adhered to the current-conducting portion of a plating jig, that can remove palladium adhered to the insulating-material-coated portion of the jig, and that exhibits reduced erosion of the metal of the current-conducting portion of the jig. The jig electrolytic stripper comprises the following components (A) to (C): (A) at least one member selected from the group consisting of nitric acid and salts thereof, (B) at least one member selected from the group consisting of ammonia, ammonium salts, ethylene amine compounds, alkyl diamine compounds, and amino acids, and (C) a bromide.

30 Claims, No Drawings

(56) References Cited

U.S. PATENT DOCUMENTS

| | | | |
|---|---|---|---|
| 6,352,636 B1* | 3/2002 | Wei | C25F 5/00 |
| | | | 204/224 M |
| 6,468,439 B1* | 10/2002 | Whitehurst | C23F 1/44 |
| | | | 257/E21.309 |
| 6,899,803 B2 | 5/2005 | Matejat et al. | |
| 8,709,277 B2 | 4/2014 | Takahashi et al. | |
| 2005/0109734 A1 | 5/2005 | Kuriyama et al. | |
| 2007/0254479 A1 | 11/2007 | Fang et al. | |
| 2013/0276284 A1* | 10/2013 | Brosseau | C22B 7/007 |
| | | | 29/426.1 |
| 2014/0021400 A1* | 1/2014 | Coenjarts | C03C 15/00 |
| | | | 252/79.4 |
| 2014/0243249 A1* | 8/2014 | Hsu | C23F 1/30 |
| | | | 510/175 |

FOREIGN PATENT DOCUMENTS

| | | |
|---|---|---|
| DE | 2146828 A1 | 4/1973 |
| DE | 19829274 A1 | 1/2000 |
| EP | 2050841 A1 | 4/2009 |
| EP | 2 514 855 A1 | 10/2012 |
| JP | 54-79131 A | 6/1979 |
| JP | 56-62999 A | 5/1981 |
| JP | 58-213900 A | 12/1983 |
| JP | 2001-207276 A | 7/2001 |
| JP | 2002-363761 A | 12/2002 |
| JP | 2009-30151 A | 2/2009 |
| WO | 82/04072 A1 | 11/1982 |
| WO | 98/45505 A1 | 10/1998 |

OTHER PUBLICATIONS

Bard, Allen J., "Encyclopedia of Electrochemistry of the Elements", Mark Dekker, Inc., 1976, vol. VI, pp. 261-264; Cited in Notice of Opposition dated Dec. 18, 2019.

Dillenberg, Horst, "Chemical and Electrochemical Stripping of Metallic Deposits", Electroplating and Metal Finishing, Nov. 1972, pp. 9-16; Cited in Notice of Opposition dated Dec. 18, 2019.

Communication of a Notice of Opposition dated Dec. 18, 2019, issued in EP Patent No. 3168332 (opposition filed by MacDermid Incorporated) (40 pages).

Communication of a Notice of Opposition dated Dec. 18, 2019, issued in EP Patent No. 3168332 (opposition filed by Atotech Deutschland GmbH) (50 pages).

* cited by examiner

ELECTROLYTIC STRIPPING AGENT FOR JIG

TECHNICAL FIELD

The present invention relates to a jig electrolytic stripper.

BACKGROUND ART

To form an electroplated film on a resin molded object, the following is typically performed in sequence: the object to be plated is degreased and etched, optionally with an acid pickling treatment to remove the etching residue, and then a conditioning treatment is performed to improve the catalyst adsorption. Subsequently, an electroless plating catalyst is added using a colloid solution containing a tin compound and a palladium compound, optionally followed by an activation treatment. Finally, electroless plating or electroplating is performed (e.g., see Patent Literature 1).

In the method above, a plating jig is typically used to fix the object to be plated. The plating jig is formed of a metal such as stainless steel for electric current conduction, and the portion other than the current-conducting portion is coated with an insulating material, such as vinyl chloride, polyolefin, and fluorine-based resin.

Examples of methods for stripping the metal film deposited on the current-conducting portion of the plating jig include a method comprising dipping the jig in a nitric acid aqueous solution and a method comprising dipping the jig in an aqueous solution containing an electrolytic stripper to perform electrolysis.

However, electrolytic stripping using an electrolytic stripper cannot sufficiently remove palladium adhered to the insulating-material-coated portion of the plating jig. Because the plating jig is repeatedly used, the palladium adhered to the plating jig is dissolved in an etching solution and accumulated in the solution. A chromic acid mixture containing chromium trioxide and sulfuric acid is widely used as an etching solution, and increased accumulation of palladium may reduce the etching performance. To maintain the etching performance, adjustment of the solution temperature or the content ratio of the components of the chromic acid mixture may be required, and it becomes complicated to control the etching solution.

Instead of the chromic acid mixture, an acidic etching solution containing manganese as an active component is sometimes used as an etching solution. However, as in the use of the chromic acid mixture, palladium adhered to the plating jig is dissolved in the etching solution and accumulated, thereby reducing the etching performance.

In addition, electrolytic stripping using the electrolytic strippers mentioned above erodes the metal, such as stainless steel, in the current-conducting portion of the plating jig.

Thus, there has been a demand for the development of a jig electrolytic stripper that can remove palladium adhered to the insulating-material-coated portion when removing palladium adhered to the current-conducting portion of the plating jig, and that also exhibits reduced erosion of the metal of the current-conducting portion of the plating jig.

CITATION LIST

Patent Literature

Patent Literature 1: WO98/45505

SUMMARY OF INVENTION

Technical Problem

An object of the present invention is to provide a jig electrolytic stripper that can sufficiently remove palladium adhered to the current-conducting portion of the plating jig, that can also remove palladium adhered to the insulating-material-coated portion, and that exhibits reduced erosion of the metal of the current-conducting portion of the plating jig.

Solution to Problem

The present inventors conducted extensive research to achieve the object, and found that a jig electrolytic stripper comprising (A) at least one member selected from the group consisting of nitric acid and salts thereof, (B) at least one member selected from the group consisting of ammonia, ammonium salts, ethylene amine compounds, alkyl diamine compounds, and amino acids, and (C) a bromide can achieve the object. The inventors then completed the present invention.

Specifically, the present invention relates to the following jig electrolytic stripper.

1. A jig electrolytic stripper comprising the following components (A) to (C):
   (A) at least one member selected from the group consisting of nitric acid and salts thereof,
   (B) at least one member selected from the group consisting of ammonia, ammonium salts, ethylene amine compounds, alkyl diamine compounds, and amino acids, and
   (C) a bromide.
2. The jig electrolytic stripper according to Item 1, comprising (D) copper ions.
3. The jig electrolytic stripper according to Item 1 or 2, comprising (E) an oxidant.
4. A method for removing palladium, the method comprising contacting the jig electrolytic stripper according to any one of Items 1 to 3 with an object to be treated on which palladium is adhered.
5. The method for removing palladium according to Item 4, wherein electrolytic stripping is performed by contacting a cathode and an anode with the jig electrolytic stripper, the anode being the object to be treated.
6. The method for removing palladium according to Item 5, wherein the cathode is separated by a diaphragm.
7. The method for removing palladium according to any one of Items 4 to 6, wherein the jig electrolytic stripper is subjected to air agitation.
8. A method for reducing the concentration of palladium accumulated in an acidic etching solution containing chromium trioxide, the method comprising performing the method for removing palladium according to any one of Items 4 to 7.
9. A method for reducing the concentration of palladium accumulated in an acidic etching solution containing manganese, the method comprising performing the method for removing palladium according to any one of Items 4 to 7.

Advantageous Effects of Invention

Because the jig electrolytic stripper according to the present invention comprises (A) at least one member selected from the group consisting of nitric acid and salts thereof, (B) at least one member selected from the group consisting of ammonia, ammonium salts, ethylene amine compounds, alkyl diamine compounds, and amino acids, and (C) a bromide, the stripper can sufficiently remove palladium adhered to the current-conducting portion of a plating jig, remove palladium adhered to the insulating-material-coated portion, and reduce erosion of the metal of the current-conducting portion of the plating jig.

DESCRIPTION OF EMBODIMENTS

The following describes the present invention in detail.
Jig Electrolytic Stripper The jig electrolytic stripper according to the present invention comprises (A) at least one member selected from the group consisting of nitric acid and salts thereof, (B) at least one member selected from the group consisting of ammonia, ammonium salts, ethylene amine compounds, alkyl diamine compounds, and amino acids, and (C) a bromide. Other components of the jig electrolytic stripper according to the present invention are not particularly limited, as long as the stripper comprises components (A) to (C). Typically, the stripper is used as an aqueous solution in which components (A) to (C) are dissolved.
Component (A)

Component (A) is at least one member selected from the group consisting of nitric acid and salts thereof. The nitric acid and salts thereof are not particularly limited, but are preferably water-soluble. Specifically, the salts of nitric acid include sodium nitrate, potassium nitrate, ammonium nitrate, calcium nitrate, iron nitrate, silver nitrate, lead nitrate, zinc nitrate, and barium nitrate. Of these, sodium nitrate, potassium nitrate, ammonium nitrate, and calcium nitrate are preferably used from the standpoint of a low likelihood of corrosion in the stainless steel of the current-conducting portion of the plating jig and their stability in use due to suppressed deposition.

The nitric acid and the salts thereof may be used singly or in any combination of two or more of the nitric acid and the salts thereof.

The content of component (A) in the jig electrolytic stripper is preferably 1 to 500 g/L, more preferably 5 to 200 g/L, and still more preferably 10 to 100 g/L. An overly small content of component (A) in the jig electrolytic stripper may result in corrosion of the stainless steel of the current-conducting portion of the plating jig, while an overly large content of component (A) may cause mist and worsen the working environment, thereby promoting the corrosion of the equipment.
Component (B)

Component (B) is at least one member selected from the group consisting of ammonia, ammonium salts, ethylene amine compounds, alkyl diamine compounds, and amino acids.

These ammonia, ammonium salts, ethylene amine compounds, alkyl diamine compounds, and amino acids are not particularly limited, but are preferably compounds capable of forming a water-soluble complex with palladium.

Specifically, the ammonium salts include ammonium sulfate, ammonium carbonate, ammonium chloride, ammonium bromide, ammonium iodide, ammonium nitrate, and ammonium acetate.

Specifically, the ethylene amine compounds include ethylene diamine, diethylene triamine, triethylenetetramine, and tetraethylenepentamine.

Specifically, the alkyl diamine compounds include 1,3-trimethylenediamine, 1,4-tetramethylenediamine, and 1,6-hexamethylenediamine.

Specifically, the amino acids include glycine, alanine, and cysteine.

Preferable component (B) includes ammonia and/or ammonium salts, from the standpoint of sufficiently removing palladium adhered to the insulating-material-coated portion of the plating jig. Of these, ammonium sulfate, ammonium bromide, ammonium nitrate, and ammonium acetate are more preferable.

The content of component (B) in the jig electrolytic stripper is preferably 1 to 500 g/L, more preferably 10 to 400 g/L, and still more preferably 30 to 300 g/L. An overly small content of component (B) in the jig electrolytic stripper may result in insufficient removal of palladium, while an overly large content of component (B) may produce a strong odor, thereby worsening the working environment.

The ammonia, ammonium salts, ethylene amine compounds, alkyl diamine compounds, and amino acids may be used singly or in a combination of two or more.
Component (C)

Component (C) is a bromide. The bromide is not particularly limited, but is preferably a water-soluble bromide. Specifically, the bromide includes hydrogen bromide, sodium bromide, potassium bromide, calcium bromide, ammonium bromide, silver bromide, lead bromide, zinc bromide, and aluminum bromide. Of these, hydrogen bromide, sodium bromide, potassium bromide, calcium bromide, and ammonium bromide are preferably used, from the standpoint of sufficiently removing palladium adhered to the insulating-material-coated portion of the plating jig and their stability in use due to suppressed deposition.

The bromides may be used singly or in a combination of two or more.

The content of component (C) in the jig electrolytic stripper is preferably 1 to 300 g/L, more preferably 5 to 200 g/L, and still more preferably 10 to 100 g/L. An overly small content of component (C) in the jig electrolytic stripper may result in insufficient removal of palladium adhered to the insulating-material-coated portion of the plating jig and insufficient stripping of nickel film deposited on the current-conducting portion of the plating jig. An overly large content of component (C) may result in corrosion of the stainless steel of the current-conducting portion of the plating jig.
Other Components The jig electrolytic stripper according to the present invention may comprise other components in addition to components (A) to (C). Examples of other components include (D) copper ions, (E) oxidants, and (F) complexing agents.
Component (D)

The jig electrolytic stripper according to the present invention may comprise (D) copper ions to further improve the palladium removability. The copper ions are not particularly limited, and examples include copper ions formed by dissolving a copper compound in the electrolytic stripper of the present invention. The copper compound is not particularly limited, as long as the compound can be dissolved in the electrolytic stripper of the present invention to produce copper ions, but is preferably a water-soluble copper compound. Examples of such copper compounds include copper sulfate, copper chloride, copper bromide, copper iodide, copper acetate, copper nitrate, and copper oxide. Of these, copper sulfate, copper bromide, copper acetate, copper nitrate, and copper oxide are preferably used, from the standpoint of their excellent removability of palladium adhered to the insulating-material-coated portion of the plating jig, and the low likelihood of corrosion of the stainless steel of the current-conducting portion of the plating jig.

Copper ions (D) for use may be copper ions obtained by electrolytic oxidation of metallic copper. This can be performed by dipping metallic copper in the jig electrolytic stripper according to the present invention and subjecting the metallic copper to electrolytic oxidation.

The content of component (D) in the jig electrolytic stripper is preferably 0.01 to 100 g/L, more preferably 0.1 to 50 g/L, and still more preferably 1 to 30 g/L. An overly small content of component (D) in the jig electrolytic stripper may not sufficiently improve the removability of palladium, while an overly large content of component (D) may increase the likelihood of sludge of the copper compound.

Component (E)

The jig electrolytic stripper according to the present invention may comprise an oxidant (E) to further improve the palladium removability. The oxidant is not particularly limited, and examples of oxidants include persulfates, halogen oxoacids, halogen oxoacid salts, chromium trioxide, chromates, permanganates, and hydrogen peroxides. Of these, persulfates, halogen oxoacids, and halogen oxoacid salts are preferably used, and persulfates, bromic acid, and bromates are more preferably used, from the standpoint of their excellent removability of palladium adhered to the insulating-material-coated portion of the plating jig and the low likelihood of corrosion of the stainless steel of the current-conducting portion of the plating jig.

The persulfates for use include sodium persulfate, potassium persulfate, and ammonium persulfate. The bromates for use include sodium bromate, potassium bromate, and ammonium bromate.

The oxidants may be used singly or in a combination of two or more.

The content of component (E) in the jig electrolytic stripper is preferably 0.01 to 100 g/L, more preferably 0.05 to 50 g/L, and still more preferably 0.1 to 20 g/L. An overly small content of component (E) in the jig electrolytic stripper may result in insufficient improvement of removability of palladium, while an overly large content of component (E) may increase the likelihood of corrosion of the stainless steel of the current-conducting portion of the plating jig.

Component (F)

The jig electrolytic stripper according to the present invention may comprise a complexing agent (F). Containing a complexing agent in the jig electrolytic stripper can reduce the deposition of metal hydroxides. The complexing agent is not particularly limited, and examples of complexing agents include acetic acid, citric acid, maleic acid, succinic acid, lactic acid, malic acid, tartaric acid, and ethylenediaminetetraacetic acid. Of these, acetic acid, maleic acid, succinic acid, and malic acid are preferable, from the standpoint of the ease of removing metal ions with a metal flocculant during the effluent treatment.

The complexing agents may be used singly or in a combination of two or more.

The content of component (F) in the jig electrolytic stripper is preferably 0.1 to 200 g/L, more preferably 1 to 100 g/L, and still more preferably 5 to 50 g/L. An overly small content of component (F) in the jig electrolytic stripper may result in an insufficient inhibitory effect on the deposition of metal hydroxides, while an overly large content of component (F) may reduce the removability of palladium adhered to the insulating-material-coated portion of the plating jig.

Other Additives

The jig electrolytic stripper according to the present invention may comprise a solvent. The jig electrolytic stripper according to the present invention is a solution of components (A) to (C) dissolved in a common solvent, and components (D) to (F) and other additives may optionally be added and dissolved in the solvent. The solvent for use may be water or another kind, and water is preferably used. Specifically, the jig electrolytic stripper according to the present invention is preferably the following aqueous solution: a solution of components (A) to (C) dissolved in water, optionally containing components (D) to (F) and other additives that are added and dissolved therein.

The jig electrolytic stripper according to the present invention has a pH of preferably 4 or more, more preferably 6 or more, and still more preferably 8 or more. An overly low pH may increase the likelihood of sludge of the metal compound and erosion of the metal material of the current-conducting portion of the jig. The jig electrolytic stripper also has a pH of preferably 12 or less, and more preferably 10 or less. An overly high pH may produce a strong odor and worsen the working environment.

Method for Removing Palladium

The present invention also encompasses a method for removing palladium comprising contacting the jig electrolytic stripper with an object to be treated on which palladium is adhered.

The object to be treated is a plating jig for immobilizing an object to be plated when electroless plating or electroplating is performed on the object to be plated. The plating jig has a current-conducting portion for performing plating and an insulating-material-coated portion coated with an insulating material to reduce erosion in the portion other than the current-conducting portion. In the plating jig, a metal material that forms the current-conducting portion is coated with an insulating material, thus forming the insulating-material-coated portion, and part of the metal material is exposed without being coated with the insulating material, thus forming the current-conducting portion. When electroless plating or electroplating is performed on an object to be plated, palladium is adhered to the current-conducting portion of the plating jig, and palladium is also adhered to the surface of the insulating material.

The metal material is not particularly limited, as long as electric current can flow through it. Examples of metal materials for use include stainless steel and titanium. Of these, stainless steel is preferably used.

The insulating material is not particularly limited, as long as the material has insulation properties. Examples of insulating materials for use include resins, such as vinyl chloride, polyolefin, and fluorine based-resin. Of these, vinyl chloride is preferably used.

The method for contacting the jig electrolytic stripper with an object to be treated on which palladium is adhered is not particularly limited. For example, an object to be treated may be dipped in the jig electrolytic stripper in accordance with a known method.

In the method for removing palladium according to the present invention, the jig electrolytic stripper has a pH of preferably 4 or more, more preferably 6 or more, and still more preferably 8 or more. An overly low pH may increase the likelihood of sludge of the metal compound and erosion of the metal material of the current-conducting portion of the jig. The jig electrolytic stripper also has a pH of preferably 12 or less, and more preferably 10 or less. An overly high pH may result in a strong odor and worsen the working environment.

In the method for removing palladium according to the present invention, the jig electrolytic stripper has a solution temperature of preferably 20° C. or more, and more preferably 30° C. or more. An overly low solution temperature for the jig electrolytic stripper may reduce the removability of palladium. The upper limit of the solution temperature for the jig electrolytic stripper is not particularly limited but preferably about 70° C. An overly high solution temperature for the jig electrolytic stripper may increase the likelihood of the evaporation of the jig electrolytic stripper and may also be economically disadvantageous in energy costs.

The method for removing palladium according to the present invention enables the removal of palladium adhered to the surface of the metal material that forms the current-conducting portion and palladium adhered to the surface of the insulating material that forms the insulating-material-coated portion by dipping the object to be treated in the jig electrolytic stripper as described above. Also, it is preferable that this method uses the object to be treated as an anode and contacts the anode and a cathode with the jig electrolytic stripper to perform electrolytic stripping. This method for removing palladium can efficiently strip palladium adhered to the surface of the metal material and the insulating material.

The cathode for use in electrolytic stripping is not particularly limited, and known cathodes for electrolytic stripping can be used. Examples of cathodes include stainless steel, copper, nickel, lead, tin, iron, zinc, brass, aluminum, and carbon.

The anode current density for electrolytic stripping is not particularly limited, and is typically within the wide range of about 0.3 to 15 A/dm$^2$. However, an overly low current density may take a long period of time for electrolytic stripping, while an overly high current density may cause the metal material to be etched.

When the method for removing palladium according to the present invention is the electrolytic stripping method as described above, the cathode is preferably separated by a diaphragm. Specifically, it is preferable that the cathode is dipped in the jig electrolytic stripper according to the present invention, and that the cathode is separated together with the surrounding jig electrolytic stripper in contact with the cathode by a diaphragm. This configuration can improve the maintenance of palladium removal performance of the jig electrolytic stripper. In addition, adding an oxidant can further improve the maintenance of the palladium removal performance.

The material of the diaphragm is not particularly limited, and any material stable in the jig electrolytic stripper can be used. Examples of such diaphragms include cation-exchange membranes, anion-exchange membranes, membranes, and biscuit membranes. In particular, perfluorinated sulfonic acid resin cation-exchange membranes are preferably used, from the standpoint of the maintenance of palladium removal performance.

In the method for removing palladium according to the present invention, the jig electrolytic stripper is preferably subjected to air agitation. Subjecting the jig electrolytic stripper to air agitation enables more efficient removal of palladium.

The method of air agitation is not particularly limited. Examples include a method comprising pumping air into the jig electrolytic stripper through a pipe formed of vinyl chloride, stainless steel, or the like, using a commercially available air pump.

The flow rate of air in the air agitation is preferably 0.1 to 5.0 L/min, and more preferably 0.3 to 3.0 L/min, per liter of the bath volume. An overly low flow rate of air in air agitation may not sufficiently improve the efficiency of palladium removal, while an overly high flow rate may increase the likelihood of solution volatilization.

Performing the method for removing palladium according to the present invention described above enables the removal of palladium adhered to the jig, which is an object to be treated. Thus, even when an object to be plated is fixed on a repeatedly used jig and dipped in an acidic etching solution containing chromium trioxide or manganese, it is possible to reduce the palladium concentration that increases when the palladium adhered to the jig is dissolved and accumulated in the acidic etching solution. The present invention also encompasses the method for reducing the concentration of palladium accumulated in an acidic etching solution containing chromium trioxide and the method for reducing the concentration of palladium accumulated in an acidic etching solution containing manganese.

EXAMPLES

The following Examples and Comparative Examples describe the present invention in more detail. However, the present invention is not limited to these Examples.

Preparation of Jig Electrolytic Stripper

In accordance with the formulae shown in Tables 9 to 11, the components were mixed, and jig electrolytic strippers of Examples 1 to 15 and Comparative Examples 1 to 8 were prepared. In these Examples and Comparative Examples, the pH was adjusted to 8.0 with sulfuric acid or sodium hydroxide.

Preparation of Insulating Material-Coated Sample

As samples of a jig coated with an insulating material, plates coated with the following resins were prepared.

Vinyl Chloride Resin-Coated Plate

A commercially available soft vinyl chloride-based coating sol polymer was applied onto an SUS304 flat plate (5 cm×5 cm, thickness 0.3 mm, surface area 0.5 dm$^2$), and dried. The plate was then dipped in a soft vinyl chloride-based coating sol (trade name: PG2401, registered trademark, produced by Alpha Kasei) for 5 seconds, and baked at 180° C. for 30 minutes, thereby preparing a vinyl chloride resin-coated plate (which may be referred to as a "vinyl chloride plate" later).

Polyethylene-Coated Plate

An SUS304 flat plate heated to 180° C. (5 cm×5 cm, thickness 0.3 mm, surface area 0.5 dm$^2$) was dipped in powdery polyethylene having a mean particle size of 1000 μm for 1 minute, and heated at 180° C. for 5 minutes to melt and smoothen the surface. Subsequently, the plate was dipped in water for cooling, thereby preparing a polyethylene-coated plate (which may be referred to as a "polyethylene plate" later).

Plating treatment was performed on the thus-prepared vinyl chloride resin-coated plate and polyethylene-coated plate in accordance with the treatment steps shown in Tables 1 to 6. Then, a palladium removability test described below was performed using the jig electrolytic strippers of Examples 1 to 15 and Comparative Examples 1 to 8.

Palladium Removability Test

To evaluate the removability of palladium adhered to the insulating-material-coated portion of a plating jig, the following test was performed. Specifically, the vinyl chloride plate or polyethylene plate was treated with a dipping method in accordance with the steps described in Tables 1 to 6 to adhere palladium to the plate. Between each step, the plate was washed with water.

The vinyl chloride plate or polyethylene plate onto which palladium was adhered was dipped in the jig electrolytic strippers of Examples 1 to 15 and Comparative Examples 1 to 8 for 5 minutes. The solution temperature of the jig electrolytic strippers at this stage was 40° C., and the flow rate of air agitation was 0.5 L/min in the case where air agitation was performed.

Subsequently, palladium adhered to the vinyl chloride plate or polyethylene plate was stripped and dissolved in 10 mL of hot aqua regia, and the solution was adjusted with ion-exchanged water to give a volume of 100 mL, followed by measurement of the palladium concentration with ICP emission spectroscopic analysis. From the measured concentration, the amount of palladium (per unit area) adhered to the vinyl chloride plate or polyethylene plate was calculated, and the palladium removal percentage was determined in accordance with the following Equation 1.

$$\text{Palladium Removal Percentage (\%)} = \left\{1 - \frac{\text{Amount of Palladium after Dipping in Electrylytic Stripper (mg/dm}^2)}{\text{Amount of Palladium before Dipping in Electrylytic Stripper (mg/dm}^2)}\right\} \times 100 \quad \text{(Equation 1)}$$

Table 12 shows the results.

Stainless-Steel Wire Erosion Test

To evaluate the erosion at the current-conduction contact point, which is the current-conducting portion of the plating jig in contact with a resin molded object, the following test was performed. Specifically, an SUS304 wire (φ2 mm, length 5 cm) was used as a test specimen, and electrolytic treatment was performed using the jig electrolytic strippers of Examples 1 to 8 and Comparative Examples 1 to 8 in the conditions shown in Table 7. The mass of the test specimen before and after the electrolytic treatment was measured, and the amount of erosion was determined in accordance with the following Equation 2.

$$\text{Amount of Erosion of SUS304 Wire (mg)} = \text{Mass (mg) of SUS304 Wire before Electrolysis} - \text{Mass (mg) of SUS304 Wire after Electrolysis} \quad \text{(Equation 2)}$$

Table 13 shows the results.

Stripping Performance Test on Copper and Nickel

To evaluate the stripping performance on the metal film deposited on the current-conducting portion of a plating jig, the following test was performed. Specifically, an SUS304 flat plate (3 cm×3.3 cm, thickness 0.3 mm, surface area 20 cm²) was plated with copper sulfate (Top Lucina 2000 bath, produced by Okuno Chemical Industries Co., Ltd), or bright nickel ((KAI) Acna B bath, Okuno Chemical Industries Co., Ltd), thereby preparing test specimens. Subsequently, the test specimens were subjected to electrolysis for 10 minutes using the jig electrolytic strippers of Examples 1 to 8 and Comparative Examples 1 to 8 in the conditions shown in Table 8. The mass of the test specimens before and after the electrolysis was measured, and the stripping rate for copper or nickel was determined in accordance with the following Equation 3. The metal density applied to Equation 3 was 8.94 g/cm³ for copper and 8.91 g/cm³ for nickel.

$$\text{Stripping Rate (}\mu\text{/min)} = \frac{(\text{Mass before Electrolysis (g)} - \text{Mass after Electrolysis (g)})}{(\text{Metal Density (g/cm}^3) \times 20 \text{ cm}^2 \times 10 \text{ min})} \times 10000 \quad \text{(Equation 3)}$$

Table 13 shows the results.

In the following Tables 1 to 6, the symbol "*" indicates that the product is produced by Okuno Chemical Industries Co., Ltd.

TABLE 1

| Treatment Step | Treatment Solution | Treatment Conditions |
|---|---|---|
| Degreasing | Alkaline-based Degreasing Solution (Ace Clean A-220* Bath) | 40° C., 5 min |
| Etching | Chromic Anhydride 400 g/L Sulfuric Acid 400 g/L Aqueous Solution | 68° C., 10 min |
| Conditioning | Conditioning Solution (CRP Conditioner 231* Bath) | 25° C., 2 min |
| Catalyzation | Palladium-Tin Colloid-based Catalyzer (CRP Catalyst 85* Bath) | 35° C., 5 min |
| Conductivity Induction | Conductivity Inducing Solution (CRP Selector* Bath) | 45° C., 5 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 2

| Treatment Step | Treatment Solution | Treatment Conditions |
|---|---|---|
| Degreasing | Alkaline-based Degreasing Solution (Ace Clean A-220* Bath) | 40° C., 5 min |
| Etching | Chromic Anhydride 400 g/L Sulfuric Acid 400 g/L Aqueous Solution | 68° C., 10 min |
| Acid Pickling | 35% Hydrochloric Acid 50 ml/L Aqueous Solution | 25° C., 2 min |
| Catalyzation | Palladium-Tin Colloid-based Catalyzer (Catalyst C-7* Bath) | 25° C., 3 min |
| Activation | 35% Hydrochloric Acid 100 ml/L Aqueous Solution | 40° C., 3 min |
| Electroless Nickel Plating | Electroless Nickel Solution (Chemical Nickel SEP-LF* Bath) | 35° C., 5 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |

TABLE 2-continued

| Treatment Step | Treatment Solution | Treatment Conditions |
| --- | --- | --- |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 3

| Treatment Step | Treatment Solution | Treatment Conditions |
| --- | --- | --- |
| Degreasing | Alkaline-based Degreasing Solution (Ace Clean A-220* Bath) | 40° C., 5 min |
| Etching | Chromic Anhydride 400 g/L Sulfuric Acid 400 g/L Aqueous Solution | 68° C., 10 min |
| Acid Pickling | 35% Hydrochloric Acid 50 ml/L Aqueous Solution | 25° C., 2 min |
| Sensitizing | First Tin-based Sensitizor (Sensitizer * Bath) | 25° C., 3 min |
| Activating | Palladium Ion-based Activator (Activator* Bath) | 30° C., 1 min |
| Electroless Nickel Plating | Electroless Nickel Plating Solution (Chemical Nickel SEP-LF* Bath) | 35° C., 5 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 4

| Treatment Step | Treatment Solution | Treatment Conditions |
| --- | --- | --- |
| Degreasing | Alkaline-based Degreasing Solution (Ace Clean A-220* Bath) | 40° C., 5 min |
| Etching | Potassium Permanganate 1.1 g/L, Methanesulfonic Acid 960 g/L Aqueous Solution | 68° C., 20 min |
| Acid Pickling | 98% Sulfuric Acid 300 ml/L Aqueous Solution | 25° C., 1 min |
| Conditioning | Conditioning Solution (CRP Conditioner 231* Bath) | 25° C., 2 min |
| Catalyzation | Palladium-Tin Colloid-based Catalyzer (CRP Catalyst 85* Bath) | 40° C., 5 min |
| Conductivity Induction | Conductivity Inducing Solution (CRP Selector* Bath) | 45° C., 5 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 5

| Treatment Step | Treatment Solution | Treatment Conditions |
| --- | --- | --- |
| Degreasing | Alkaline-based Degreasing Solution (Ace Clean A-220* Bath) | 40° C., 5 min |
| Etching | Potassium Permanganate 1.1 g/L, Methanesulfonic Acid 960 g/L Aqueous Solution | 68° C., 20 min |
| Acid Pickling | 98% Sulfuric Acid 300 ml/L Aqueous Solution | 25° C., 1 min |
| Catalyzation | Palladium-Tin Colloid-based Catalyzer (Catalyst C-7* Bath) | 40° C., 5 min |
| Activation | 35% Hydrochloric Acid 100 ml/L Aqueous Solution | 40° C., 3 min |
| Electroless Nickel Plating | Electroless Nickel Plating Solution (Chemical Nickel SEP-LF* Bath) | 35° C., 5 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 6

| Treatment Step | Treatment Solution | Treatment Conditions |
| --- | --- | --- |
| Degreasing | Alkaline-based Degreasing Solution (Ace Clean A-220* Bath) | 40° C., 5 min |
| Etching | Potassium Permanganate 1.1 g/L, Methanesulfonic Acid 960 g/L Aqueous Solution | 68° C., 20 min |
| Acid Pickling | 98% Sulfuric Acid 300 ml/L Aqueous Solution | 25° C., 1 min |
| Catalyzation | Alkaline Palladium Ion-based Catalyzer (OPC-50 Inducer* Bath) | 40° C., 5 min |
| Activation | Activator (OPC-150 Cryster* Bath) | 25° C., 1 min |
| Electroless Copper Plating | Electroless Copper Plating Solution (Electroless Copper 500* Bath) | 25° C., 10 min |
| Copper Sulfate Plating | Copper Sulfate Plating Solution (Top Lucina 2000* Bath) | 25° C., 30 min |
| Semi-bright Nickel Plating | Semi-bright Nickel Plating Solution (Acna NEO* Bath) | 55° C., 10 min |
| Bright Nickel Plating | Bright Nickel Plating Solution ((KAI) Acna B* Bath) | 55° C., 10 min |
| Chromium Plating | Trivalent Chromium Plating Solution (TOP Fine Chrome WR* Bath) | 35° C., 5 min |

TABLE 7

| Anode | Test Materials: SUS304 Wire (φ 2 mm, Length 5 cm) |
|---|---|
| Cathode | SUS304 Plate (120 mm × 50 mm, Thickness 0.3 mm) |
| Anode Current Density | 70 A/dm² |
| Temperature | 40° C. |
| Agitation | Air Agitation performed at a flow rate of 0.5 L/min |
| Electrolysis Time | 30 min |

TABLE 8

| Anode | Test Material: SUS304 Plate (3 cm × 3.3 cm, Thickness 0.3 mm, Surface Area 20 cm²), A plating film of copper sulfate or bright nickel was formed on the test material. |
|---|---|
| Cathode | SUS304 Plate (120 mm × 50 mm, Thickness 0.3 mm) |
| Anode Current Desity | 20 A/dm² |
| Temperature | 40° C. |
| Agitation | Air Agitation performed at a flow rate of 0.5 L/min |
| Electrolysis Time | 10 min |

TABLE 9

| | Examples | | | | | | | |
|---|---|---|---|---|---|---|---|---|
| | 1 | 2 | 3 | 4 | 5 | 6 | 7 | 8 |
| Sodium Nitrate (g/L) | 70 | 70 | 70 | 70 | | 70 | 70 | 70 |
| Ammonium Nitrate (g/L) | | | | | 70 | | | |
| Sodium Bromide (g/L) | 50 | 50 | 50 | 50 | | 50 | 50 | 50 |
| Ammonium Bromide (g/L) | | | | | 50 | | | |
| 25% Ammonia Water (g/L) | 100 | | | | | 100 | 100 | 100 |
| Ethylenediamine (g/L) | | 50 | | | | | | |
| 1,6-Hexanediamine (g/L) | | | 50 | | | | | |
| Glycine (g/L) | | | | 50 | | | | |
| Copper Sulfate Pentahydrate (g/L) | | | | | | 10 | | |
| Sodium Persulfate (g/L) | | | | | | | 10 | |
| Sodium Bromate (g/L) | | | | | | | | 10 |
| Treatment Steps of Palladium Removability Test | Table 1 | Table 1 | Table 1 | Table 1 | Table 1 | Table 1 | Table 1 | Table 1 |
| Air Agitation | Done | Done | Done | Done | Done | Done | Done | Done |

TABLE 10

| | Examples | | | | | | |
|---|---|---|---|---|---|---|---|
| | 9 | 10 | 11 | 12 | 13 | 14 | 15 |
| Sodium Nitrate (g/L) | 70 | 70 | 70 | 70 | 70 | 70 | 70 |
| Sodium Bromide (g/L) | 50 | 50 | 50 | 50 | 50 | 50 | 50 |
| 25% Ammonia Water (g/L) | 100 | 100 | 100 | 100 | 100 | 100 | 100 |
| Copper Sulfate Pentahydrate (g/L) | | | | | | | 10 |
| Treatment Steps of Palladium Removability Test | Table 2 | Table 3 | Table 4 | Table 5 | Table 6 | Table 1 | Table 1 |
| Air Agitation | Done | Done | Done | Done | Done | Not Done | Not Done |

TABLE 11

| | Comparative Examples | | | | | | | |
|---|---|---|---|---|---|---|---|---|
| | 1 | 2 | 3 | 4 | 5 | 6 | 7 | 8 |
| Sodium Nitrate (g/L) | 70 | 70 | | 70 | 70 | 70 | 70 | 70 |
| Sodium Bromide (g/L) | 50 | | 50 | | | | | |
| Sodium Chloride (g/L) | | | | 50 | | 50 | 50 | 50 |
| Sodium Iodide (g/L) | | | | | 50 | | | |
| 25% Ammonia Water (g/L) | | 100 | 100 | 100 | 100 | 100 | 100 | 100 |
| Copper Sulfate Pentahydrate (g/L) | | | | | | 10 | | |
| Sodium Persulfate (g/L) | | | | | | | 10 | |
| Sodium Bromate (g/L) | | | | | | | | 10 |
| Treatment Steps of Palladium Removability Test | Table 1 | Table 1 | Table 1 | Table 1 | Table 1 | Table 1 | Table 1 | Table 1 |
| Air Agitation | Done | Done | Done | Done | Done | Done | Done | Done |

TABLE 12

| | Palladium Removability Test (Vinyl Chloride Plate) | | | Palladium Removability Test (Polyethylene Plate) | | |
|---|---|---|---|---|---|---|
| | Amount of Palladium Before Dipping (mg/dm$^2$) | Amount of Palladium After Dipping (mg/dm$^2$) | Palladium Removal Percentage (%) | Amount of Palladium Before Dipping (mg/dm$^2$) | Amount of Palladium After Dipping (mg/dm$^2$) | Palladium Removal Percentage (%) |
| Example 1 | 0.250 | 0.025 | 90.0 | 0.188 | 0.018 | 90.4 |
| Example 2 | 0.250 | 0.045 | 82.0 | 0.188 | 0.030 | 84.0 |
| Example 3 | 0.250 | 0.068 | 72.8 | 0.188 | 0.052 | 72.3 |
| Example 4 | 0.250 | 0.066 | 73.6 | 0.188 | 0.039 | 79.3 |
| Example 5 | 0.250 | 0.030 | 88.0 | 0.188 | 0.020 | 89.4 |
| Example 6 | 0.250 | 0.009 | 96.4 | 0.188 | 0.006 | 96.8 |
| Example 7 | 0.250 | 0.011 | 95.6 | 0.188 | 0.004 | 97.9 |
| Example 8 | 0.250 | 0.014 | 94.4 | 0.188 | 0.005 | 97.3 |
| Example 9 | 0.150 | 0.016 | 89.3 | 0.119 | 0.011 | 90.8 |
| Example 10 | 0.198 | 0.018 | 90.9 | 0.143 | 0.015 | 89.5 |
| Example 11 | 0.265 | 0.027 | 89.8 | 0.180 | 0.019 | 89.4 |
| Example 12 | 0.146 | 0.012 | 91.8 | 0.119 | 0.012 | 89.9 |
| Example 13 | 0.270 | 0.027 | 90.0 | 0.190 | 0.016 | 91.6 |
| Example 14 | 0.250 | 0.103 | 58.8 | 0.188 | 0.080 | 57.4 |
| Example 15 | 0.250 | 0.089 | 64.4 | 0.188 | 0.067 | 64.4 |
| Comparative Example 1 | 0.250 | 0.204 | 18.4 | 0.188 | 0.158 | 16.0 |
| Comparative Example 2 | 0.250 | 0.220 | 12.0 | 0.188 | 0.165 | 12.2 |
| Comparative Example 3 | 0.250 | 0.050 | 80.0 | 0.188 | 0.034 | 81.9 |

TABLE 12-continued

|  | Palladium Removability Test (Vinyl Chloride Plate) | | | Palladium Removability Test (Polyethylene Plate) | | |
| --- | --- | --- | --- | --- | --- | --- |
|  | Amount of Palladium Before Dipping (mg/dm²) | Amount of Palladium After Dipping (mg/dm²) | Palladium Removal Percentage (%) | Amount of Palladium Before Dipping (mg/dm²) | Amount of Palladium After Dipping (mg/dm²) | Palladium Removal Percentage (%) |
| Comparative Example 4 | 0.250 | 0.203 | 18.8 | 0.188 | 0.155 | 17.6 |
| Comparative Example 5 | 0.250 | 0.043 | 82.8 | 0.188 | 0.031 | 83.5 |
| Comparative Example 6 | 0.250 | 0.199 | 20.4 | 0.188 | 0.140 | 25.5 |
| Comparative Example 7 | 0.250 | 0.185 | 26.0 | 0.188 | 0.136 | 27.7 |
| Comparative Example 8 | 0.250 | 0.189 | 24.4 | 0.188 | 0.136 | 27.7 |

TABLE 13

|  | Stainless-Steel Wire Erosion Test | Stripping Performance Test on Copper and Nickel | |
| --- | --- | --- | --- |
|  | Amount of Erosion of SUS304 (mg) | Copper Stripping Rate (μm/min) | Nickel Stripping Rate (μm/min) |
| Example 1 | 0.01 | 5.3 | 4.3 |
| Example 2 | 0.02 | 5.2 | 4.2 |
| Example 3 | 0.01 | 5.4 | 4.3 |
| Example 4 | 0.01 | 5.1 | 4.2 |
| Example 5 | 0.01 | 5.5 | 4.5 |
| Example 6 | 0.01 | 5.3 | 4.5 |
| Example 7 | 0.01 | 5.3 | 4.2 |
| Example 8 | 0.02 | 5.4 | 4.4 |
| Comparative Example 1 | 0.01 | 5.0 | 3.9 |
| Comparative Example 2 | 0.02 | 4.8 | 0.1 |
| Comparative Example 3 | 53.43 | 5.1 | 4.1 |
| Comparative Example 4 | 10.92 | 5.3 | 4.3 |
| Comparative Example 5 | 77.85 | 4.9 | 0.2 |
| Comparative Example 6 | 13.09 | 5.0 | 4.4 |
| Comparative Example 7 | 15.10 | 5.1 | 4.5 |
| Comparative Example 8 | 15.92 | 5.0 | 4.2 |

The results above reveal that dipping in the jig electrolytic stripper according to the present invention can remove palladium adhered to the insulating-material-coated portion of the plating jig. In addition, the results of Example 6 reveal that the jig electrolytic stripper containing divalent copper ions exhibits further improved palladium removability. The results of Examples 7 and 8 reveal that the jig electrolytic stripper containing an oxidant exhibits further improved palladium removability.

The results also reveal that the difference of treatment steps is unlikely to have a significant impact on the palladium removability, and dipping an object to be treated in the jig electrolytic stripper according to the present invention can effectively remove palladium, without depending on the treatment steps.

The jig electrolytic strippers (Examples 14 and 15) for which air agitation was not performed exhibited a lower palladium removability than the jig electrolytic strippers for which air agitation was performed, indicating that subjecting the jig electrolytic stripper to air agitation can improve the palladium removability.

The results shown in Table 13 indicate that because the jig electrolytic strippers according to the present invention erode the stainless-steel wire only in a minimal amount, the erosion at the current-conduction contact point of the plating jig was minor. In Examples 1 to 8, the stripping rate was about 5 μm/min for copper, and about 4 μm/min for nickel, indicating that the strippers have a high stripping performance on copper and nickel.

In contrast, the jig electrolytic stripper (Comparative Example 1) that contains none of ammonia, ammonium salts, ethylene amine compounds, alkyl diamine compounds, or amino acids had a low palladium removal percentage, indicating its low palladium removability. Likewise, the jig electrolytic stripper (Comparative Example 2) that contains no bromide exhibited a low palladium removability and further exhibited a low stripping performance on nickel.

In the jig electrolytic strippers that contain other halides instead of the bromide, the use of chloride as a halide exhibited a low palladium removability with erosion of the stainless-steel wire (Comparative Examples 4, 6, 7, and 8). The use of iodide as a halide resulted in a significant amount of erosion of the stainless-steel wire, although exhibiting palladium removability, and also exhibited a low stripping performance on nickel (Comparative Example 5).

The electrolytic stripper that contains no nitric acid compound (Comparative Example 3) resulted in a significant amount of erosion of the stainless-steel wire.

Palladium Removal Maintenance Test

In accordance with the formula shown in Table 14, the components were mixed, thereby preparing a jig electrolytic stripper. The jig electrolytic stripper was adjusted to a pH of 8.0 with an aqueous sodium hydroxide solution. Electrolysis was performed using the obtained jig electrolytic stripper, with diaphragms or oxidants shown in Table 16 under the conditions shown in Table 15. In Examples 16 to 18, the diaphragms indicated in Table 16 were used to separate the cathode from the anode. The perfluorinated sulfonic acid resin cation-exchange membrane used in Example 16 and the neutral membrane diaphragm used in Example 17 were fixed with an acrylic attachment to form a cathode chamber, thereby separating the cathode from the jig electrolytic stripper in contact with the anode. At this stage, the cathode chamber was filled with a jig electrolytic stripper of the same formula as that of the stripper used for the object to be treated. In Examples 19 to 21, 1 g/L of the oxidant was mixed with the jig electrolytic stripper before electrolysis, and 1 g/L of the oxidant was further added after every hour of electrolysis.

In accordance with the procedure shown in Table 1, the vinyl chloride plate on which palladium was adhered was dipped in the jig electrolytic stripper that served for electrolysis at a temperature of 40° C. with air agitation at a flow rate of 0.5 L/min for 5 minutes.

Subsequently, the amount of palladium adhered to the vinyl chloride plate was measured, and the palladium removal percentage was determined in accordance with Equation 1 described above. The amount of palladium before dipping in the electrolytic stripper was 0.250 mg/dm$^2$.

Table 17 shows the results.

TABLE 14

|  | Jig Electrolytic Stripper |
|---|---|
| Ammonium Nitrate (g/L) | 60 |
| Ammonium Bromide (g/L) | 30 |
| Ammonium Acetate (g/L) | 30 |
| Copper Sulfate Pentahydrate (g/L) | 10 |
| 25% Ammonia Water (g/L) | 100 |
| pH | 8.0 |

TABLE 15

| Anode | SUS304 Wire (φ 2 mm, Length 5 cm) |
|---|---|
| Cathode | SUS304 Plate (120 mm × 50 mm, Thickness 0.3 mm) |
| Anode Current Density | 20 A/dm$^2$ |
| Temperature | 40° C. |
| Flow Rate of Air Agitation | 0.5 L/min |

TABLE 16

|  | Diaphragm | | |
|---|---|---|---|
|  | Type of Diaphragm | Trade Name | Oxidant |
| Example 16 | Perfluorinated Sulfonic Acid Resin Cation-Exchange Membrane (Thickness 0.15 mm) | Nafion324 (Produced by Dupon) | None |
| Example 17 | Neutral Membrane Diaphragm (Thickness 0.22 mm) | Y-9205TA Produced by Yuasa Membrane Systems Co., Ltd. | None |
| Example 18 | Cylindrical Biscuit Diaphragm (Thickness 3 mm) | Produced by Nikkato | None |
| Example 19 | None | — | Sodium Persulfate |
| Example 20 | None | — | Sodium Bromate |
| Example 21 | None | — | None |

TABLE 17

|  | 10 Hours After Electrolysis | | 300 Hours After Electrolysis | |
|---|---|---|---|---|
|  | Amount of Palladium After Dipping (mg/dm$^2$) | Palladium Removal Percentage (%) | Amount of Palladium After Dipping (mg/dm$^2$) | Palladium Removal Percentage (%) |
| Example 16 | 0.025 | 90.0 | 0.026 | 89.6 |
| Example 17 | 0.029 | 88.4 | 0.055 | 78.0 |
| Example 18 | 0.031 | 87.6 | 0.070 | 72.0 |
| Example 19 | 0.017 | 93.2 | 0.018 | 92.8 |
| Example 20 | 0.020 | 92.0 | 0.022 | 91.2 |
| Example 21 | 0.093 | 62.8 | 0.194 | 22.4 |

The results above reveal that the use of the jig electrolytic stripper according to the present invention with the cathode separated by a diaphragm from the anode, which is the object to be treated, can further maintain the palladium removal percentage. In particular, the use of a perfluorinated sulfonic acid resin cation-exchange membrane as a diaphragm can maintain the palladium removal percentage excellently. The results also indicate that continuous supply of an oxidant can maintain the palladium removability at a high level.

Evaluation Test of Palladium Accumulated in Etching Solution

As shown in Table 18, ten vinyl chloride plates were treated in accordance with the steps shown in Table 1 or 4. Subsequently, the vinyl chloride plates were dipped in the jig electrolytic stripper shown in Table 14 at a temperature of 40° C. with air agitation at a flow rate of 0.5 L/min for 5 minutes.

This operation was repeated 10 times. In this operation, the ten vinyl chloride plates were repeatedly used. The amount of the treatment solution used in each treatment was 1 L. The vinyl chloride plates were washed with water between the steps. After the operation was repeated 10 times, the concentration of palladium in each etching solution was examined with ICP emission spectroscopic analysis, and the concentration of palladium accumulation was measured.

Table 18 shows the results.

TABLE 18

|  | Steps | Type of Etching Solution | Dipping in Electrolytic Stripper | Concentration of Accumulated Palladium in Etching Solution (mg/L) |
|---|---|---|---|---|
| Example 22 | Table 1 | Chromic Acid Mixture | Applied | 5.1 |
| Example 23 | Table 4 | Acidic Permanganic Acid | Applied | 4.7 |
| Comparative Example 9 | Table 1 | Chromic Acid Mixture | Not Applied | 108 |
| Comparative Example 10 | Table 4 | Acidic Permanganic Acid | Not Applied | 103 |

The results reveal that dipping an object to be treated in the electrolytic stripper of the present invention can reduce the amount of palladium accumulated in the etching solution (Examples 22 and 23). The difference in type of the etching solution was unlikely to have a significant impact on the amount of palladium accumulation. Both the etching solution containing chromic acid mixture and the etching solution containing acidic permanganic acid exhibited a small amount of palladium accumulation, indicating that stable etching performance can be maintained.

In contrast, the absence of dipping in the jig electrolytic stripper (Comparative Examples 9 and 10) resulted in a high concentration of palladium in the etching solution, indicating that etching performance is lowered.

Evaluation Test of Amount of Sludge in Electrolytic Stripper

In accordance with the formulae shown in Table 20, jig electrolytic strippers of Examples 24 to 30 were prepared. The pH of the jig electrolytic strippers was adjusted with an aqueous solution of sulfuric acid or sodium hydroxide. Copper sulfate plating films (Top Lucina 2000 bath, Okuno Chemical Industries Co., Ltd) formed on SUS304 flat plates (3 cm×3.3 cm, thickness 0.3 mm, surface area 20 cm$^2$) were individually subjected to electrolysis using the electrolytic strippers in the conditions shown in Table 19 and stripped and dissolved. Subsequently, the amount of sludge derived from the insoluble copper compound was visually observed and evaluated.

Table 20 shows the results.

TABLE 19

| Anode | SUS304 Plate (3 cm × 3.3 cm, Thickness 0.3 mm, Surface Area 20 cm$^2$) with a copper sulfate plating film formed thereon |
|---|---|
| Cathode | SUS304 Plate (120 mm × 50 mm, Thickness 0.3 mm) |
| Anode Current Density | 20 A/dm$^2$ |
| Temperature | 40° C. |
| Agitation | Air agitation performed at a flow rate of 0.5 L/min |
| Electrolysis Time | 10 min |

TABLE 20

| | Electrolytic Stripper | | | | | | |
|---|---|---|---|---|---|---|---|
| | Example 24 | Example 25 | Example 26 | Example 27 | Example 28 | Example 29 | Example 30 |
| Ammonium Nitrate (g/L) | | | | 60 | | | |
| Ammonium Bromide (g/L) | | | | 30 | | | |
| Ammonium Acetate (g/L) | | | | 30 | | | |
| Copper Sulfate Pentahydrate (g/L) | | | | 30 | | | |
| 25% Ammonia Water (g/L) | | | | 100 | | | |
| pH | 4.0 | 5.0 | 6.0 | 7.0 | 8.0 | 9.0 | 10.0 |
| Amount of Generated Sludge | Small Amount | Large Amount | Extremely Large Amount | Large Amount | Almost None | Almost None | Almost None |

The results above reveal that adjusting the pH of the electrolytic stripper to 8 to 10 can reduce the generation of sludge derived from the insoluble copper compound.

The invention claimed is:

1. A jig electrolytic stripper for removing palladium adhered to an insulating material coated portion comprising the following components (A) to (C) and component (E):
   (A) at least one member selected from the group consisting of sodium nitrate, potassium nitrate, calcium nitrate, iron nitrate, silver nitrate, lead nitrate, zinc nitrate, and barium nitrate,
   (B) at least one member selected from the group consisting of ammonia, ammonium salts, ethylene amine compounds, alkyl diamine compounds, and amino acids,
   (C) a bromide, and
   (E) an oxidant, wherein the oxidant (E) is at least one member selected from the group consisting of bromates, and
   wherein the content of component (E) is 0.1 to 20 g/L.

2. The jig electrolytic stripper according to claim 1, wherein the stripper is an aqueous solution in which components (A) to (C) and component (E) are dissolved in water.

3. The jig electrolytic stripper according to claim 1, wherein the content of component (A) is 10 to 100 g/L.

4. The jib electrolytic stripper according to claim 1, wherein the component (B) is selected from the group consisting of ethylene diamine, diethylene triamine, triethylenetetramine, tetraethylenepentamine, 1,3-trimethylenediamine, 1,4-tetramethylenediamine, 1,6-hexamethylenediamine, glycine, alanine, and cysteine.

5. The jig electrolytic stripper according to claim 1, wherein the content of component (B) is 30 to 300 g/L.

6. The jig electrolytic stripper according to claim 1, wherein the component (C) is selected from the group consisting of hydrogen bromide, sodium bromide, potassium bromide, calcium bromide, and ammonium bromide.

7. The jig electrolytic stripper according to claim 1, wherein the content of component (C) is 10 to 100 g/L.

8. The jig electrolytic stripper according to claim 1, wherein the component (E) is at least one bromate.

9. The jig electrolytic stripper according to claim 1, comprising (D) copper ions.

10. The jig electrolytic stripper according to claim 9, further comprising a component (F), wherein component (F) is a complexing agent.

11. The jig electrolytic stripper according to claim 9, wherein the copper ions are from a copper compound selected from the group consisting of copper sulfate, copper chloride, copper bromide, copper iodide, copper acetate, copper nitrate, and copper oxide.

12. The jig electrolytic stripper according to claim 9, wherein the content of component (D) is 1 to 30 g/L.

13. The jig electrolytic stripper according to claim 10, wherein the component (F) is selected from the group consisting of acetic acid, citric acid, maleic acid, succinic acid, lactic acid, malic acid, tartaric acid, and ethylenediaminetetraacetic acid.

14. A jig electrolytic stripper for removing palladium adhered to an insulating material coated portion comprising the following components (A) to (F):
- (A) is selected from the group consisting of sodium nitrate, potassium nitrate, calcium nitrate, iron nitrate, silver nitrate, lead nitrate, zinc nitrate, and barium nitrate, and is at a content of 10 to 100 g/L,
- (B) is selected from the group consisting of ethylene diamine, diethylene triamine, triethylenetetramine, tetraethylenepentamine, 1,3-trimethylenediamine, 1,4-tetramethylenediamine, 1,6-hexamethylenediamine, glycine, alanine, and cysteine, and is at a content of 30 to 300 g/L,
- (C) is selected from the group consisting of hydrogen bromide, sodium bromide, potassium bromide, calcium bromide, and ammonium bromide, and is at a content of 10 to 100 g/L,
- (D) is selected from the group consisting of copper sulfate, copper chloride, copper bromide, copper iodide, copper acetate, copper nitrate, and copper oxide, and the content of copper ions is 1 to 30 g/L,
- (E) is selected from the group consisting of bromic acid and bromates, and is at a content of 0.1 to 20 g/L,
- (F) is selected from the group consisting of acetic acid, citric acid, maleic acid, succinic acid, lactic acid, malic acid, tartaric acid, and ethylenediaminetetraacetic acid, and is at a content of 5 to 50 g/L,
wherein stripper is an aqueous solution dissolved in water, and
wherein the stripper has a pH of 8 to 10.

15. The jig electrolytic stripper according to claim 10, wherein the content of component (F) is 5 to 50 g/L.

16. The jig electrolytic stripper according to claim 10, wherein the stripper has a pH of 8 to 10.

17. A method for removing palladium adhered to an insulating material coated portion, the method comprising contacting a jig electrolytic stripper comprising the following components (A) to (C) and component (E) with an object to be treated on which palladium is adhered:
- (A) at least one member selected from the group consisting of sodium nitrate, potassium nitrate, calcium nitrate, iron nitrate, silver nitrate, lead nitrate, zinc nitrate, and barium nitrate,
- (B) at least one member selected from the group consisting of ammonia, ammonium salts, ethylene amine compounds, alkyl diamine compounds, and amino acids,
- (C) a bromide, and
- (E) an oxidant, wherein the oxidant (E) is at least one member selected from the group consisting of bromates, and
wherein the content of component (E) is 0.1 to 20 g/L.

18. The method for removing palladium according to claim 17, wherein electrolytic stripping is performed by contacting a cathode and an anode with the jig electrolytic stripper, the anode being the object to be treated.

19. The method for removing palladium according to claim 18, wherein the cathode is separated by a diaphragm.

20. The method for removing palladium according to claim 17, wherein the jig electrolytic stripper is subjected to air agitation.

21. A method for reducing the concentration of palladium accumulated in an acidic etching solution containing chromium trioxide, the method comprising performing the method for removing palladium according to claim 17.

22. A method for reducing the concentration of palladium accumulated in an acidic etching solution containing manganese, the method comprising performing the method for removing palladium according to claim 17.

23. The method for removing palladium according to claim 18, wherein the jig electrolytic stripper is subjected to air agitation.

24. The method for removing palladium according to claim 19, wherein the jig electrolytic stripper is subjected to air agitation.

25. A method for reducing the concentration of palladium accumulated in an acidic etching solution containing chromium trioxide, the method comprising performing the method for removing palladium according to claim 18.

26. A method for reducing the concentration of palladium accumulated in an acidic etching solution containing chromium trioxide, the method comprising performing the method for removing palladium according to claim 19.

27. A method for reducing the concentration of palladium accumulated in an acidic etching solution containing chromium trioxide, the method comprising performing the method for removing palladium according to claim 20.

28. A method for reducing the concentration of palladium accumulated in an acidic etching solution containing manganese, the method comprising performing the method for removing palladium according to claim 18.

29. A method for reducing the concentration of palladium accumulated in an acidic etching solution containing manganese, the method comprising performing the method for removing palladium according to claim 19.

30. A method for reducing the concentration of palladium accumulated in an acidic etching solution containing manganese, the method comprising performing the method for removing palladium according to claim 20.

* * * * *